UNITED STATES PATENT OFFICE.

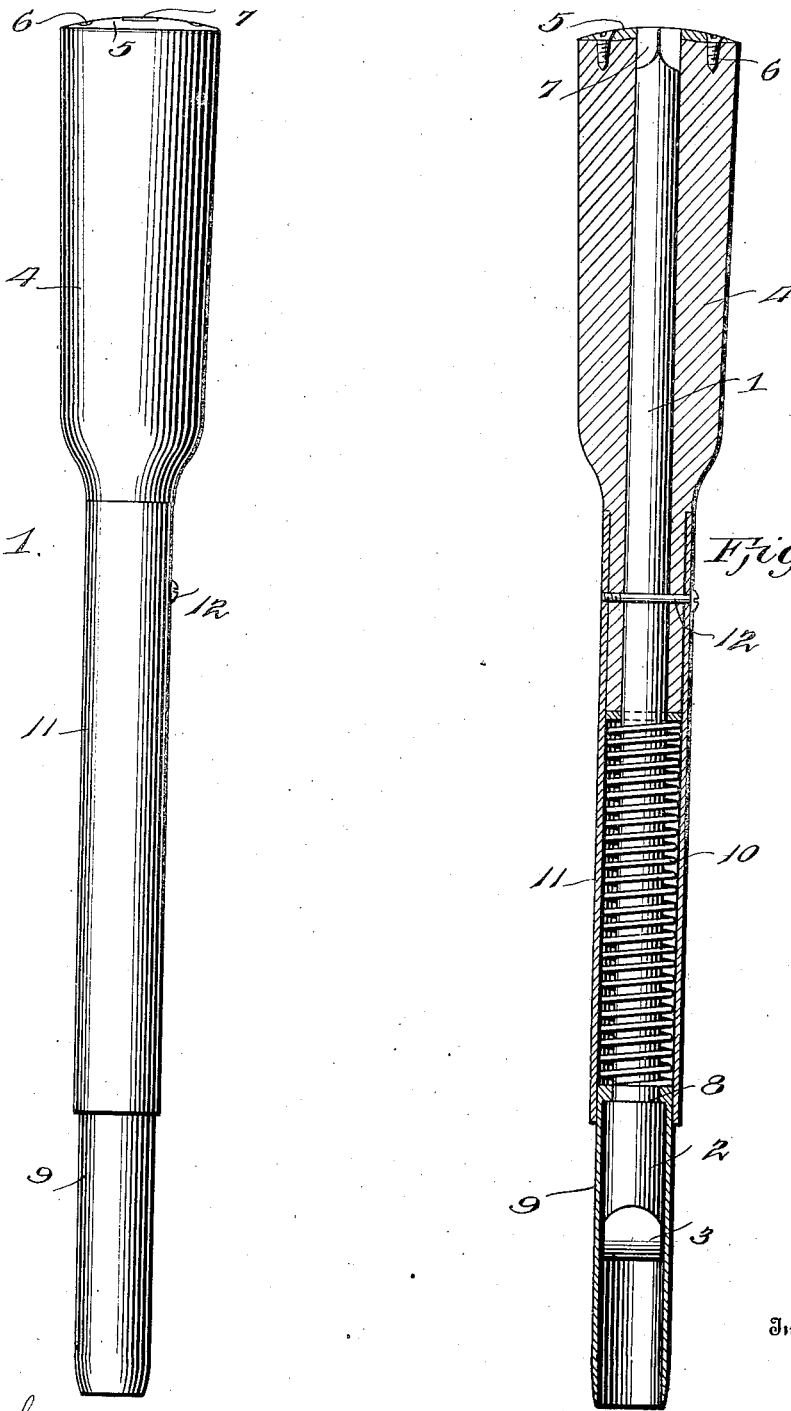

SIMON H. WIESEDEPPE, OF OLYMPIA, WASHINGTON.

SCREW-DRIVER.

No. 909,723. Specification of Letters Patent. Patented Jan. 12, 1909.

Application filed February 20, 1906. Serial No. 302,064.

*To all whom it may concern:*

Be it known that I, SIMON H. WIESEDEPPE, a citizen of the United States, residing at Olympia, in the county of Thurston and State of Washington, have invented new and useful Improvements in Screw-Drivers, of which the following is a specification.

This invention relates to screw drivers, and has for its objects to produce a comparatively simple, inexpensive device of this character wherein the tool will be maintained in proper engagement with the screw during operation of inserting or removing the same, one wherein the screw will be properly guided during the driving operation, and one in which the screw receiving sleeve will yield readily as the screw advances into or is withdrawn from the wood.

With these and other objects in view, the invention comprises the novel features of construction and combination of parts more fully hereinafter described.

In the accompanying drawings: Figure 1 is an elevation of a screw driver embodying the invention. Fig. 2 is a longitudinal section taken centrally therethrough.

Referring to the drawings, 1 designates the stem or shank of the tool provided at its forward end with a head 2 having a sharpened engaging portion 3, there being fitted upon the rear end of the shank a handle 4 fixed against rotation by means of a metal cap plate 5 secured in place by fastening members or screws 6 and having a central non-circular opening to receive a non-circular portion 7 of the shank.

Slidably disposed upon the forward portion of the shank 1 and limited in its outward movement by means of a shoulder 8 formed by the rear end of the head 2 is a tubular screw receiving member or sleeve 9 in which the head 2 is normally housed, said sleeve which may slide freely upon the shank and head being normally projected beyond the latter and pressed to projecting position under the action of an expanded spring 10 coiled upon the shank and having bearing at its ends respectively against the forward end of the handle 4 and the rear end of the sleeve.

Applied around the shank 1 and housing the spring 10 is a tubular protecting member or casing 11 fitted at its rear end upon the forward portion of the handle 4 and attached to the latter by means of a connecting member or screw 12 extended transversely through the casing, handle and shank 1, it being observed in this connection that the screw serves in conjunction with the cap plate 5 to fix the handle against rotation on the shank, and further, that the sleeve 9, which is fitted at its rear end in the forward end of the casing 10, will be properly guided in its movements by means of the casing, shank and head 2.

By passing the screw 12 through the shank 1, handle 4, and casing 11, the casing is rigidly held on the handle and the handle rigidly held on the shank, and the screw forms the sole means for preventing the handle from being drawn longitudinally off the shank. The screw coöperates with the plate 5 to prevent relative turning of the handle and shank. In case the plate 5 should become detached, the screw will still hold the parts together so that the screw driver will not be rendered useless. Another important feature is the arrangement of the screw whereby the head of the same can serve as an index for ascertaining the position of the sharpened edge or screw-engaging blade 3 of the shank. In other words, the sharp edge is always parallel with the screw so that the operator will be enabled to readily place the screw-engaging blade in the slot of a screw.

In practice, the sleeve 9 will be normally projected beyond the tool head under the action of spring 10 and when it is desired to employ the tool for driving a screw the latter is introduced into the forward portion of the sleeve and the sharpened portion 3 properly engaged with the tool seat in the screw head. The tool is then manipulated as usual and as the screw enters the wood the sleeve 9 which bears at its forward end upon the surface of the latter will be pressed backward into the casing 11 and the spring 10 consequently compressed. If the tool be employed for removing a screw the sleeve will as the screw leaves the wood be pressed outward by the spring and be thus maintained in proper contact with the wood and in position for receiving the screw. It is apparent that in the operation of the device the sleeve 9 minimizes liability of the sharpened end 3 becoming disengaged from the screw and wholly prevents the tool, should such disengagement occur, from coming in contact with and marring the surface of the wood.

By reason of the particular organization and relative arrangement of the tubular casing 11, the shank 1 with its cylindrical enlargement 2, and the sleeve 9 with its internal shoulder, the sleeve 9 has a close sliding fit upon the enlarged portion 2 of the shank 1 while the internal shoulder of the sleeve has a close sliding fit on the smaller portion of the shank 1, and said sleeve also has a close sliding fit within the tubular casing 11. Therefore, while there is a free sliding relation between the parts mentioned, there is an entire absence of any objectionable wabbling or lost motion in the outward and inward movement of the sleeve. Furthermore, the outer casing 11 is secured firmly and rigidly to the handle which together with the tubular casing 11 forms the stock of the screw driver. This is productive of a practical and mechanical tool for the purpose described.

Having thus described my invention, what I claim is:

A hand screw-driver comprising a handle, a tubular casing fastened to the handle and forming therewith the stock of the screw-driver, a screw engaging shank fastened within the handle and extending lengthwise through the tubular casing, said shank having a cylindrical end portion of relatively larger diameter forming an annular shoulder located within the plane of the extremity of said casing, a sleeve embracing said larger portion of the shank and arranged to telescope with a close sliding fit into said casing and also provided at its inner end with an internal shoulder which coöperates with the annular shoulder of the shank to limit the outward movement of said sleeve, said sleeve having a close sliding fit on the larger portion of the shank while the internal shoulder thereof has a close sliding fit on the smaller portion of the shank, and a spring housed within said casing and serving to press the sleeve outward until said shoulders meet.

In testimony whereof, I affix my signature in presence of two witnesses.

SIMON H. WIESEDEPPE.

Witnesses:
C. H. GRULERSON,
HUGH ROSS.